Figure 1:
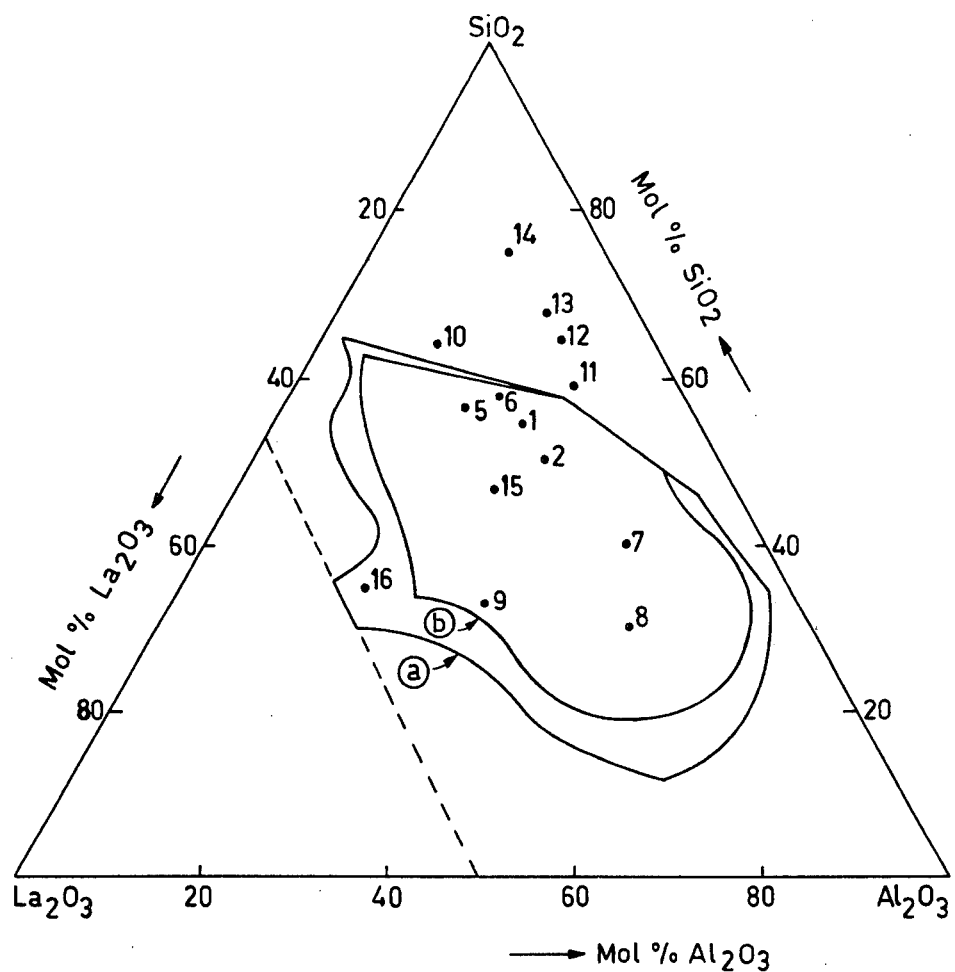
Figure 2:
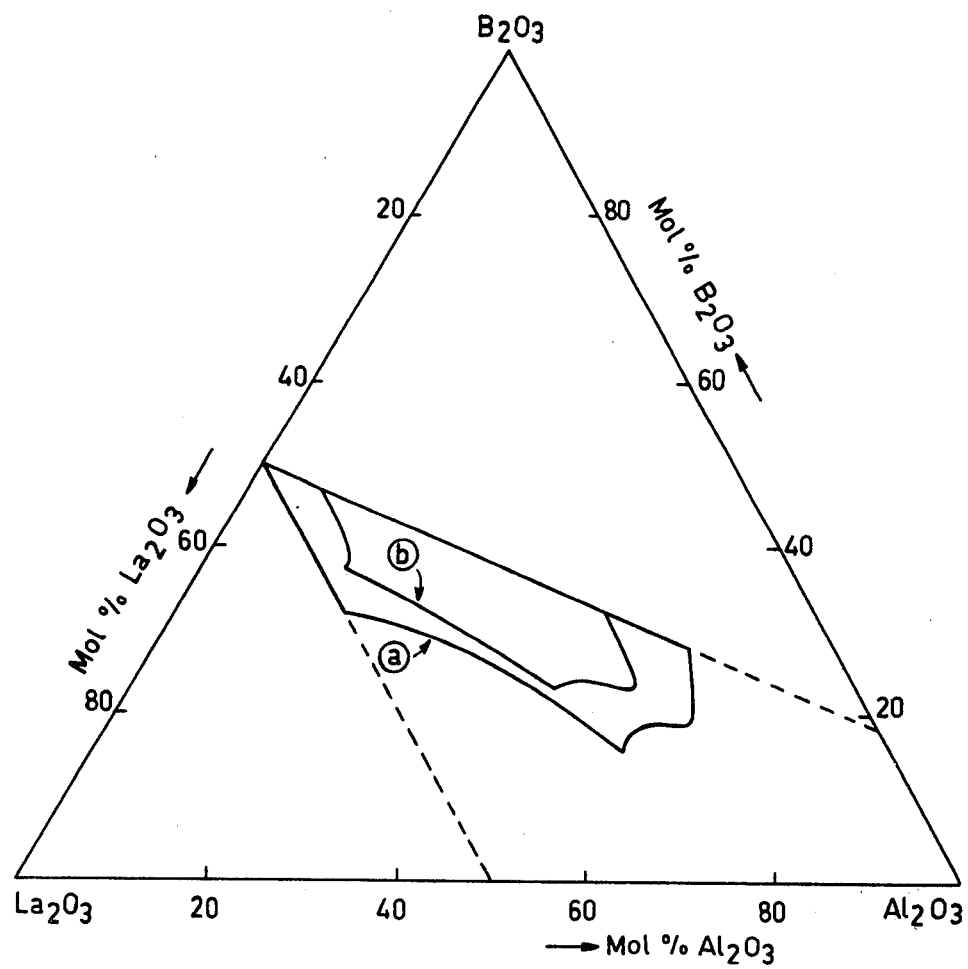
Figure 3:
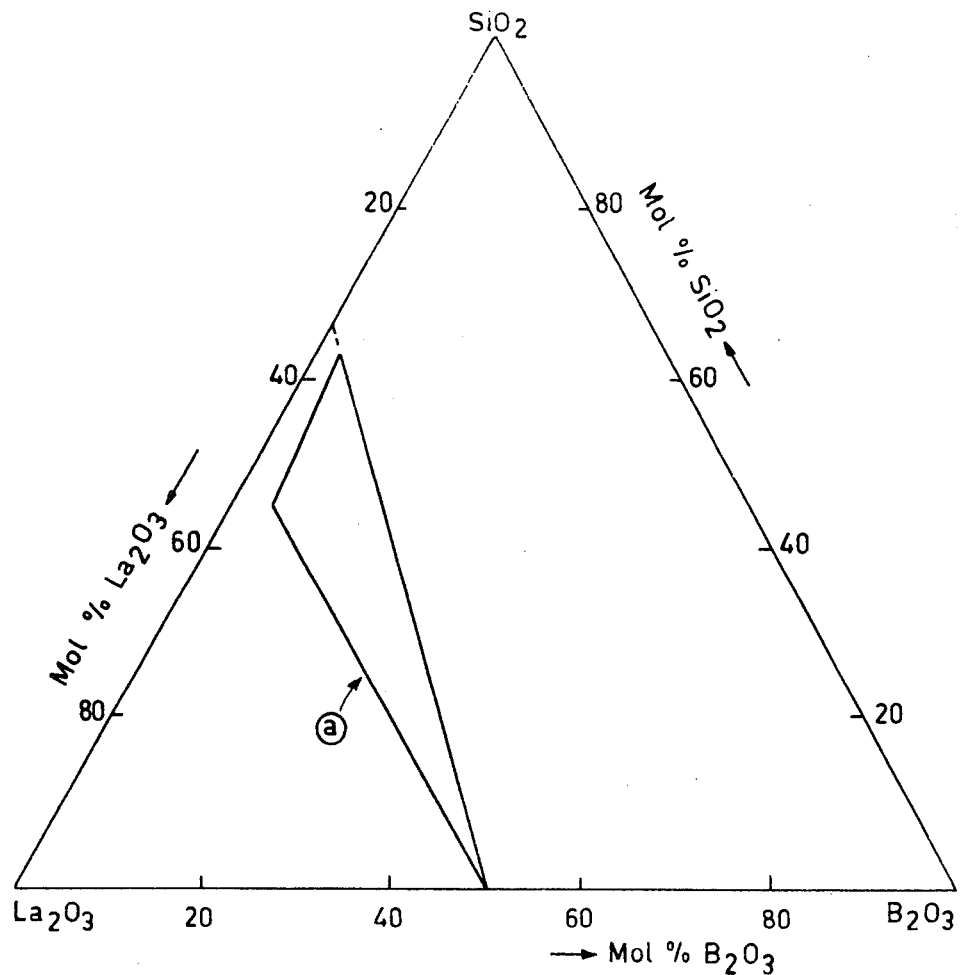
Figure 4:
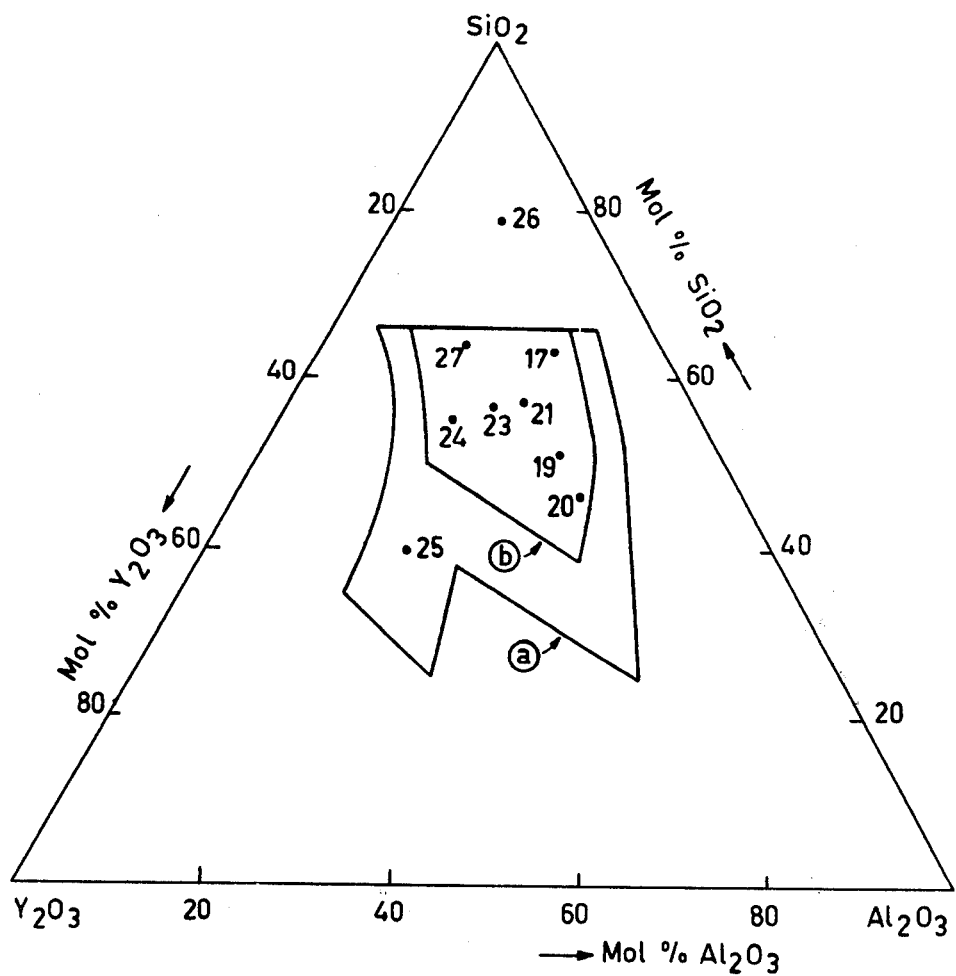

United States Patent [19]

Meden-Piesslinger et al.

[11] 4,122,042

[45] Oct. 24, 1978

[54] COMPOSITE BODY USEFUL IN GAS DISCHARGE LAMP

[75] Inventors: Gertraud Agnes Anna Meden-Piesslinger; Johannes Theodorus Klomp; Joris Jan Cornelis Oomen, all of Eindhoven, Netherlands

[73] Assignee: U.S. Philips Corporation, New York, N.Y.

[21] Appl. No.: 819,711

[22] Filed: Jul. 28, 1977

[30] Foreign Application Priority Data

Aug. 5, 1976 [NL] Netherlands ............................ 7608688

[51] Int. Cl.$^2$ ............................................. H01B 1/02
[52] U.S. Cl. .................... 252/513; 252/512; 252/514; 252/515; 252/521; 313/220; 313/221; 106/52; 106/54; 106/73.2
[58] Field of Search ............... 252/512, 513, 515, 518, 252/521; 313/220, 221; 106/54, 52, 73.2, 47

[56] References Cited

U.S. PATENT DOCUMENTS

| | | | |
|---|---|---|---|
| 3,173,779 | 3/1965 | Navias | 106/54 X |
| 3,563,773 | 2/1971 | Brömer et al. | 106/54 |
| 3,588,573 | 6/1971 | Chen et al. | 313/221 |
| 3,609,437 | 9/1971 | Tol et al. | 313/221 X |
| 4,001,625 | 1/1977 | Schat et al. | 313/221 X |

*Primary Examiner*—Benjamin R. Padgett
*Assistant Examiner*—E. Suzanne Park
*Attorney, Agent, or Firm*—Frank R. Trifari; Robert S. Smith

[57] ABSTRACT

A composite body consisting of two or more formed parts of densely sintered aluminum oxide and a metal such as an envelope for a mercury vapor discharge lamp with a metal halide filling. The parts are connected together with material which comprises at least two of the oxides $SiO_2$, $Al_2O_3$ and $B_2O_3$ and at least one of the trivalent oxides $La_2O_3$ and $Y_2O_3$. This material is applied at a relatively low temperature and is resistant to the gas filling up to approximately 1350° C.

6 Claims, 12 Drawing Figures

COMPOSITE BODY USEFUL IN GAS DISCHARGE LAMP

The invention relates to a composite body consisting of two or more formed parts of density sintered aluminium oxide, saphire, one of the metals tantalum, niobium, tungsten, molybdenum or alloys with one of these metals as main component or with iron, nickel or cobalt as main component and/or material consisting of a mixture of metal oxide and a metal (cermet), which parts are joined together gas and vacuum-tight by means of sealing material which results in a joint which is resistant to the action of iodide-, bromide-chloride-vapour and -liquid at temperatures up to approximately 1350° C, aluminium oxide and an oxide or a rare earth metal being present in the material of this joint.

The invention relates in particular to a gas discharge lamp wherein the envelope consists of above-mentioned densely sintered aluminium oxide, which is provided with an electrode feedthrough of molybdenum and as gas filling mercury vapour, doped with a metal chloride, -bromide or -iodide, for example thallium iodide. Densely sintered aluminium is the material which is eminently suitable against the action of metal halides at temperatures up to 1350° C. U.S. Pat. No. 3,234,421 discloses such a gas discharge lamp.

U.S. Pat. No. 3,588,573 discloses a sealing material which consists of a binary or ternary composition of aluminium oxide and one or more oxides of rare earth metals of substantially eutectic composition, which sealing material furnishes a joint which is eminently resistant to the action of metal iodides, bromides and chlorides. A disadvantage of this adhesive material is that it has high melting temperatures so that great mechanical stresses remain in the joint produced.

In practice processing temperatures of not more than 1700° C and, preferably, not more than 1600° C are suitable to obtain composite bodies of the type mentioned in the preamble.

The invention provides such a composite body wherein the joint is formed by material which satisfies this requirement as regards making the joint and which material of the joint is resistant to contact with metal iodide, bromide and chloride vapour at temperatures up to 1350° C.

The composite body according to the invention is characterized in that the material of the joint which is at least partly crystallized comprises at least two of the oxides $SiO_2$, $Al_2O_3$ and $B_2O_3$ and at least one of the trivalent oxides $La_2O_3$ and $Y_2O_3$ in quantities which in mole % have at the utmost the following values: $SiO_2$ 66.6, $La_2O_3$ 50, $B_2O_3$ 50, $Y_2O_3$ 50 and $Al_2O_3$ 70, the sealing material for obtaining the joint being applied at a temperature of not more than 1700° C and the material of the joint obtained therewith being located in a composition range within a tetrahedron formed by the components $Al_2O_3$-$La_2O_3$-$SiO_2$-$B_2O_3$, whose limits in the side planes of the tetrahydron are shown in the accompanying FIGS. 1, area ⓐ, 2, area ⓐ and 3, area ⓐ and which are further defined by the cross-sections in FIGS. 8 area ⓐ, 9 area ⓐ and 10 area ⓐ, or in a composition range located within a tetrahedron formed by the components $Al_2O_3$-$La_2O_3$-$SiO_2$-$Y_2O_3$, whose limits in the side planes of the tetrahedron are shown in the FIGS. 1, area ⓐ and 4, area ⓐ and are further determined by the cross-sections in FIGS. 5, area ⓐ, 6 area ⓐ and 7 area ⓐ.

Figure 5:
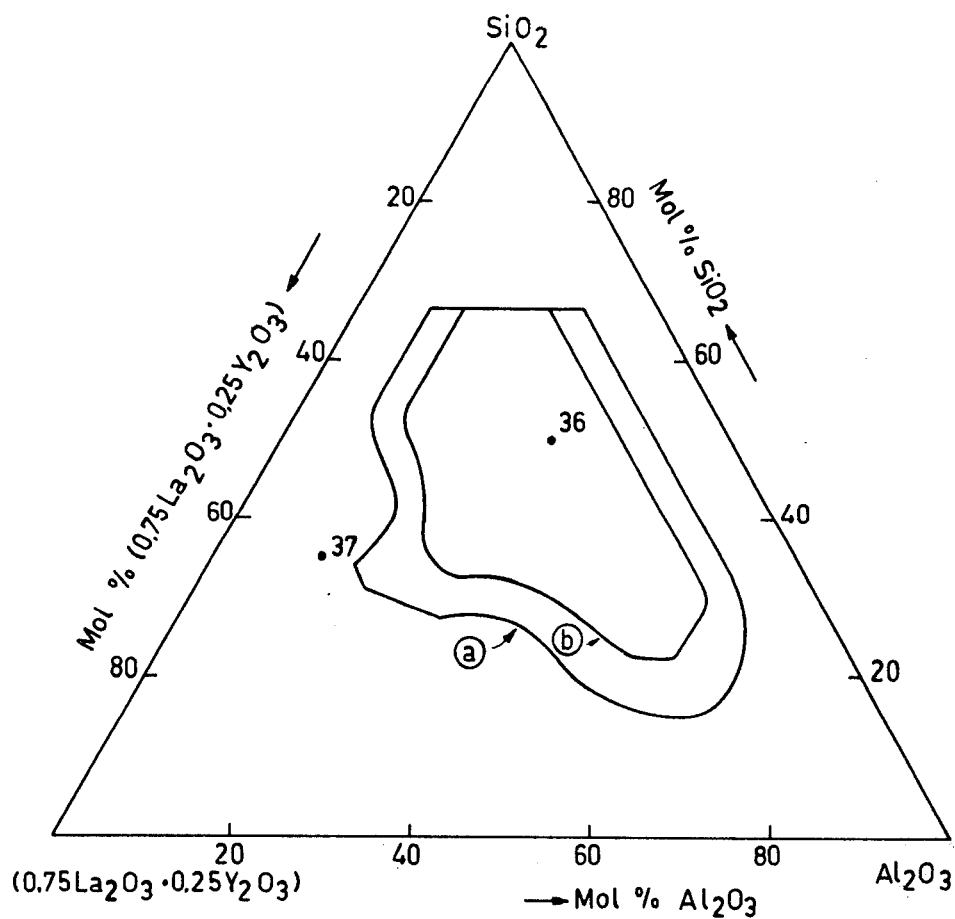
Figure 6:
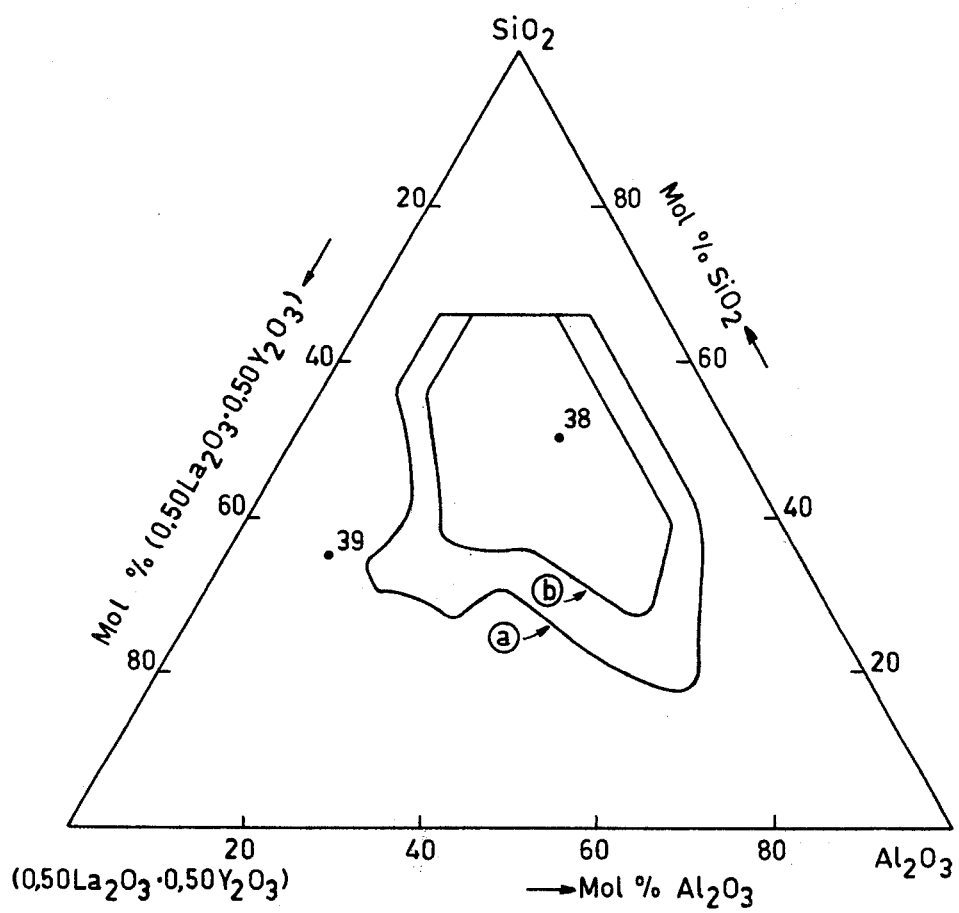
Figure 7:
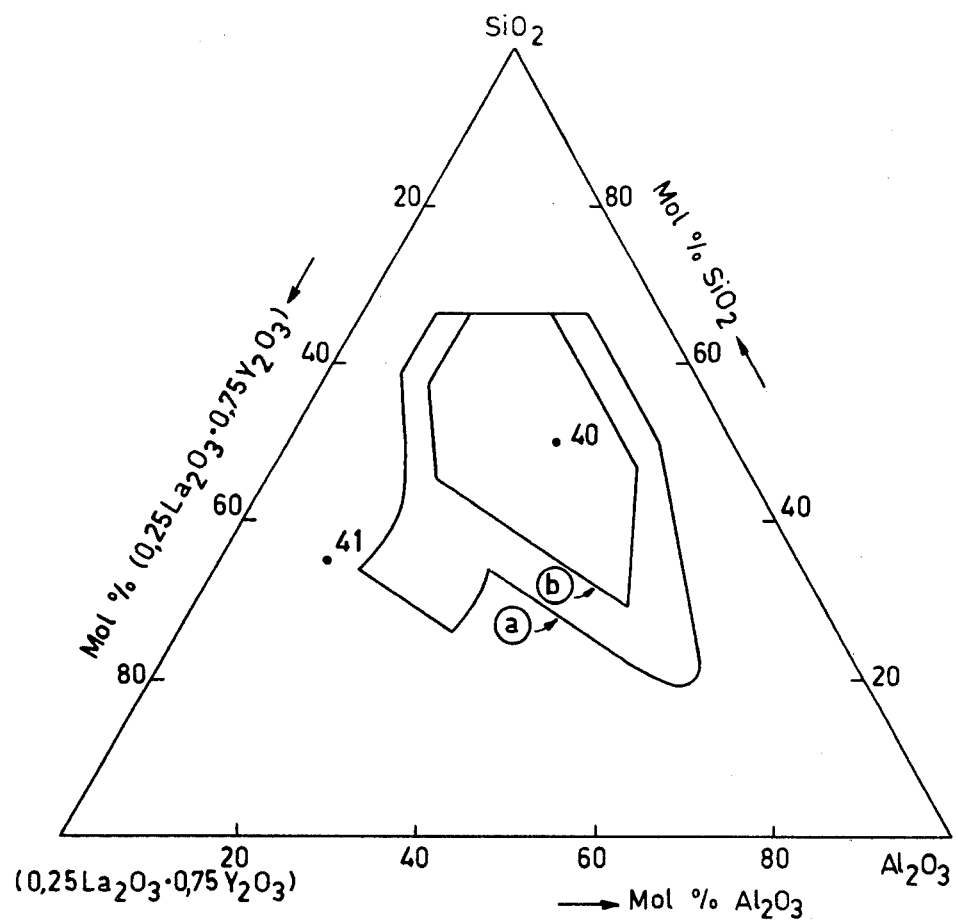
Figure 8:
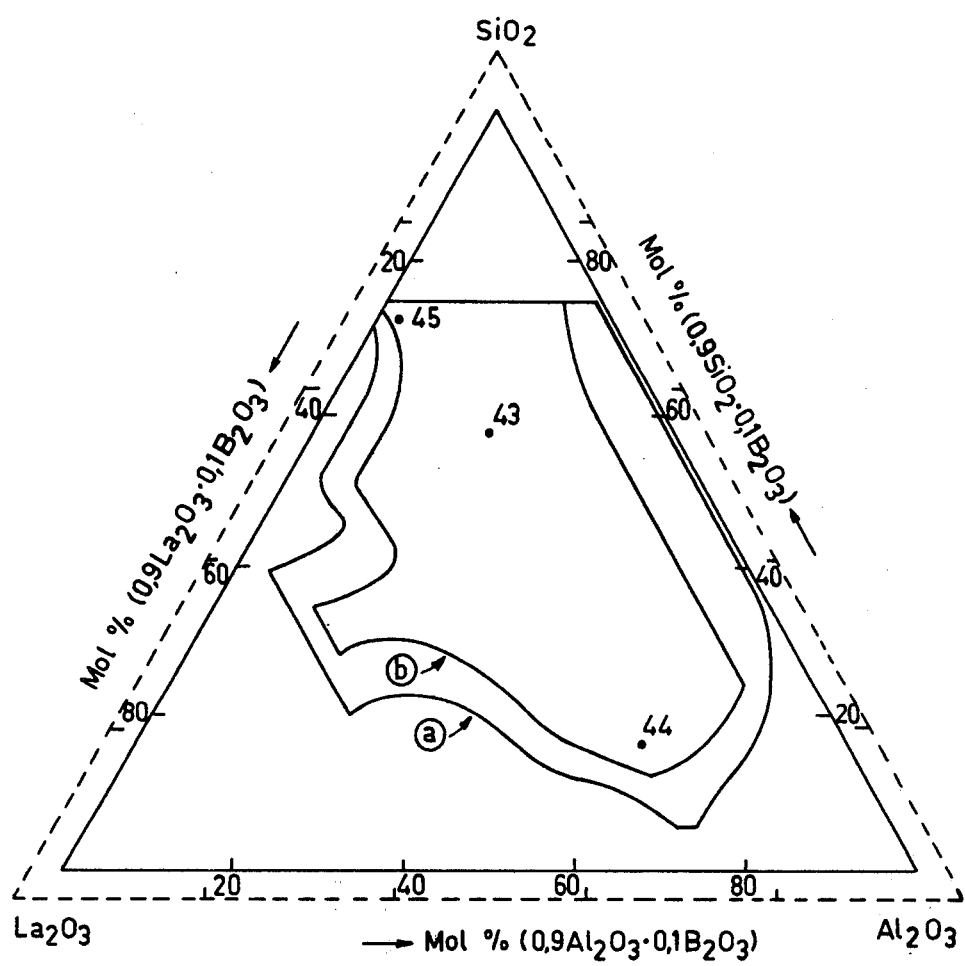

A processing temperature of not more than 1600° C can be achieved with compositions with which, when making the joint, one arrives in the following composition range which is located within a tetrahedron, formed by the components $Al_2O_3$-$La_2O_3$-$SiO_2$-$B_2O_3$, whose limits in the side planes of the tetrahedron are shown in the accompanying FIGS. 1, area ⓑ, 2, area ⓑ and 3, area ⓑ and which are further defined by the cross-sections in FIGS. 8, area ⓑ, 9, area ⓑ and 10, area ⓑ, or in a composition range located within a tetrahedron formed by the components $Al_2O_3$-$La_2O_3$-$SiO_2$-$Y_2O_3$, whose limits in the side planes of the tetrahedron are shown in the FIGS. 1, area ⓑ and 4, area ⓑ and which are further determined by the cross-sections in FIGS. 5, area ⓑ, 6, area ⓑ and 7, area ⓑ.

It should be noted that when making a joint between two parts one of which consists at least of densely sintered aluminium oxide a starting composition of the sealing material may be chosen which comprises less $Al_2O_3$ then corresponds with the areas defined in the Figures. When making the joint a reaction occurs between the aluminium oxide and the sealing material wherein $Al_2O_3$ dissolves in last-mentioned material. Then the material in the joint obtains a higher $Al_2O_3$ content. In the ultimate product the composition of the material of the joint must be within the areas described above. The geometry of the feedthrough plays an important part herein. Besides the action of metal chlorides, -bromides or iodides the $SiO_2$-free materials of the joint are also resistant to the action of sodium vapour. In accordance with a further elaboration of the invention the $La_2O_3$ and/or $Y_2O_3$ may have been wholly or partly replaced in the material of the joint by one or more of the oxides of the lanthanides and of scandium.

Furthermore the material of the joint may contain to a total of not more than 20 mole % one or more of the oxides $TiO_2$, $ZrO_2$ and $HfO_2$. These additions influence the crystallization behaviour of the starting material and, consequently, the quality of the joint.

The materials of the joints in accordance with the areas defined above are all vitreous-crystalline or polycrystalline. Vitreous-crystalline means that one or more crystalline phases are present, finely dispersed in a vitreous phase.

The manner of applying the sealing material for producing the composite body according to the invention is, for example, the customary manner wherein the formed parts are pressed and kept together, the sealing material is applied on the seam in the form of a suspension or a ring of glass wire or of sintered glass which may be either crystallized or vitreous, and the whole assembly being heated to the required temperature, the material then flowing into the seams. It is also possible to enamel the surfaces to be connected with the sealing material.

Another method is that wherein the seams between said parts are filled with the sealing material in the vitreous state, the whole assembly being heated to a temperature above the softening temperature of the sealing material whereinafter the joint is effected under pressure. The vitreous joint obtained can be reinforced by crystallization at a slightly higher temperature than the transformation temperature. The glass-ceramic joint is sufficiently strong at temperatures up to 1350° C–1450° C above which flow of the material occurs.

Of the materials of the joint in accordance with last-mentioned preferred range which must be applied at a normal pressure at temperatures below 1600° C wherein the material flows the transformation temperature (the temperature at which the viscosity amounts to $10^{13.6}$ poises) is as a rule between 850° and 900° C. When a pressure of, for example, 8 atm. is used, the joint can be made at approximately 950°–1050° C and devitrification of the joint can be effected at 1050°–1150° C. Herebelow some embodiments are given with reference to diagrammatic drawings to explain the invention.

EXAMPLE 1

As starting material for the joint to be made for obtaining the composite body according to the invention a plurality of compositions were melted to glass from which either glass wire or glass powder was produced. The glasses were melted, starting from lanthanum oxide having a purity over 99.995%, yttrium oxide, aluminium oxide 99.8% sand having a purity of 99.9%, optionally titanium dioxide, boron trioxide, hafnium oxide, zirconium sand $ZrSiO_4$. The melting temperatures varied from 1500° to 1900° C. The Tables 1 to 6 list a number of the melted compositions.

Table 1

| | Composition wt % | | | Composition mole % | | |
|---|---|---|---|---|---|---|
| No. | $Al_2O_3$ | $La_2O_3$ | $SiO_2$ | $Al_2O_3$ | $La_2O_3$ | $SiO_2$ |
| 1 | 22.5 | 51.0 | 26.5 | 27.0 | 19.1 | 53.9 |
| 2 | 25 | 51 | 24 | 30.6 | 19.5 | 49.9 |
| 3 | 21 | 53 | 24 | 26.8 | 21.2 | 52.0 |
| 4 | 27.3 | 51.1 | 21.6 | 34.1 | 20.0 | 45.9 |
| 5 | 15 | 60 | 25 | 19.7 | 24.6 | 55.7 |
| 6 | 19.1 | 52.3 | 28.6 | 22.7 | 19.5 | 57.8 |
| 7 | 38.6 | 41.2 | 20.2 | 45 | 15 | 40 |
| 8 | 38.0 | 48.6 | 13.4 | 50 | 20 | 30 |
| 9 | 20.9 | 66.8 | 12.3 | 33.3 | 33.3 | 33.4 |
| 10 | 10 | 60 | 30 | 12.5 | 23.6 | 63.9 |
| 11 | 29.1 | 37.4 | 33.5 | 29.8 | 12.0 | 58.2 |
| 12 | 26.9 | 33.5 | 39.6 | 25.6 | 10.2 | 64.2 |
| 13 | 23.9 | 34.0 | 42.1 | 22.6 | 10.2 | 67.2 |
| 14 | 15.5 | 38.5 | 46.0 | 14.8 | 11.5 | 74.7 |
| 15 | 20 | 60 | 20 | 27.5 | 25.8 | 46.7 |
| 16 | 10.8 | 78.0 | 11.2 | 20 | 45 | 35 |

Table 2

| | Composition wt % | | | Composition mole % | | |
|---|---|---|---|---|---|---|
| No. | $Al_2O_3$ | $Y_2O_3$ | $SiO_2$ | $Al_2O_3$ | $Y_2O_3$ | $SiO_2$ |
| 17 | 28.0 | 30.9 | 41.1 | 25.0 | 12.5 | 62.5 |
| 18 | 24.8 | 31.4 | 43.8 | 21.9 | 12.5 | 65.6 |
| 19 | 31.6 | 39.4 | 29.0 | 32.0 | 18 | 50 |
| 20 | 35.8 | 38.6 | 25.6 | 37 | 18 | 45 |
| 21 | 25.3 | 41.2 | 33.5 | 25.1 | 18.5 | 56.4 |
| 22 | 15.6 | 46.6 | 37.8 | 15.5 | 20.9 | 63.6 |
| 23 | 21.3 | 47.2 | 31.5 | 22.2 | 22.2 | 55.6 |
| 24 | 16.6 | 54.8 | 28.6 | 18.5 | 27.5 | 54.0 |
| 25 | 16.7 | 65.8 | 17.5 | 22 | 39 | 39 |
| 26 | 15.0 | 27.6 | 57.4 | 12 | 10 | 78 |

Table 3

| | Composition in mole % | | | | | Composition in wt % | | | | |
|---|---|---|---|---|---|---|---|---|---|---|
| No. | $Al_2O_3$ | $La_2O_3$ | $B_2O_3$ | $SiO_2$ | $HfO_2$ | $Al_2O_3$ | $La_2O_3$ | $B2O_3$ | $SiO_2$ | $HfO_2$ |
| 27 | 30 | 36 | 34 | | | 17.9 | 68.3 | 13.8 | | |
| 28 | 14 | 50 | 36 | | | 7.1 | 80.5 | 12.4 | | |
| 29 | 10 | 50 | 40 | | | 5.1 | 81.0 | 13.9 | | |
| 30 | 31.4 | 27.2 | 28.4 | 13 | | 21.7 | 59.6 | 13.4 | 5.3 | |
| 31 | 37.5 | 23.5 | 24 | 15 | | 27.3 | 54.4 | 11.9 | 6.4 | |
| 32 | 47 | 17 | 21 | 15 | | 37.9 | 43.5 | 11.5 | 7.1 | |
| 33 | 42 | 22.5 | 22.5 | | 13 | 27.0 | 45.9 | 9.9 | | 17.2 |
| 34 | 45 | 20 | 20 | | 15 | 29.4 | 41.5 | 8.9 | | 20.2 |
| 35 | 22 | 37.5 | 25.5 | | 15 | 11.5 | 62.9 | 9.2 | | 16.4 |

Table 4

| | Composition in mole % | | | | Composition in wt % | | | |
|---|---|---|---|---|---|---|---|---|
| No. | $Al_2O_3$ | $La_2O_3$ | $Y_2O_3$ | $SiO_2$ | $Al_2O_3$ | $La_2O_3$ | $Y_2O_3$ | $SiO_2$ |
| 36 | 30 | 15 | 5 | 50 | 25.3 | 40.5 | 9.3 | 24.9 |
| 37 | 12 | 39.8 | 13.2 | 35 | 6.3 | 67.3 | 15.5 | 10.9 |
| 38 | 30 | 10 | 10 | 50 | 26.4 | 28.1 | 19.5 | 26.0 |
| 39 | 12 | 26.5 | 26.5 | 35 | 6.8 | 48.1 | 33.4 | 11.7 |
| 40 | 30 | 5 | 15 | 50 | 27.6 | 14.7 | 30.6 | 27.1 |
| 41 | 12 | 13.2 | 39.8 | 35 | 7.4 | 25.9 | 54.1 | 12.6 |
| 42 | 19.5 | 22.5 | 2.9 | 55.1 | 15 | 55 | 5 | 25 |

Table 5

| | Composition in mole % | | | | Composition in wt % | | | |
|---|---|---|---|---|---|---|---|---|
| No. | $Al_2O_3$ | $La_2O_3$ | $SiO_2$ | $B_2O_3$ | $Al_2O_3$ | $La_2O_3$ | $SiO_2$ | $B_2O_3$ |
| 43 | 20 | 20 | 50 | 10 | 16.6 | 53.2 | 24.5 | 5.7 |
| 44 | 51.3 | 22.5 | 16.2 | 10 | 36.8 | 51.5 | 6.8 | 4.9 |
| 45 | 5.0 | 23.4 | 61.6 | 10 | 4.1 | 60.8 | 29.5 | 5.6 |
| 46 | 17.8 | 17.8 | 44.4 | 20 | 15.5 | 49.7 | 22.9 | 11.9 |
| 47 | 33.2 | 29.2 | 17.6 | 20 | 22.0 | 62.0 | 6.9 | 9.1 |
| 48 | 6.4 | 22.0 | 51.6 | 20 | 5.3 | 58.2 | 25.2 | 11.3 |
| 49 | 14.8 | 14.8 | 37.1 | 33.3 | 13.9 | 44.3 | 20.5 | 21.3 |
| 50 | 27.7 | 24.3 | 14.7 | 33.3 | 20.3 | 56.8 | 6.3 | 16.6 |
| 51 | 8.3 | 25.4 | 33.0 | 33.3 | 6.3 | 61.6 | 14.8 | 17.3 |

Table 6

| | Composition in mole % | | | | | | | Composition in wt % | | | | | | |
|---|---|---|---|---|---|---|---|---|---|---|---|---|---|---|
| No | $Al_2O_3$ | $La_2O_3$ | $SiO_2$ | $ZrO_2$ | $HfO_2$ | $TiO_2$ | $Sc_2O_3$ | $Al_2O_3$ | $La_2O_3$ | $SiO_2$ | $ZrO_2$ | $HfO_2$ | $TiO_2$ | $Sc_2O_3$ |
| 52 | 16.6 | 11.9 | 66.5 | 5.0 | | | | 16.6 | 38.1 | 39.2 | 6.1 | | | |
| 53 | 25.7 | 18.1 | 51.2 | 5.0 | | | | 21.0 | 48.6 | 25.3 | 5.1 | | | |
| 54 | 15.7 | 11.3 | 63.0 | 10.0 | | | | 15.9 | 36.6 | 35.3 | 12.2 | | | |
| 55 | 30.7 | 18.0 | 41.3 | 10.0 | | | | 24.6 | 46.2 | 19.5 | 9.7 | | | |
| 56 | 16.6 | 11.9 | 66.5 | | 5.0 | | | 15.9 | 36.5 | 37.7 | | 9.9 | | |
| 57 | 27.0 | 20.5 | 47.5 | | 5.0 | | | 20.7 | 50.1 | 21.4 | | 7.8 | | |
| 58 | 26.8 | 10.8 | 52.4 | | 10.0 | | | 23.7 | 30.6 | 27.4 | | 18.3 | | |
| 59 | 17.4 | 11.3 | 61.3 | | 10.0 | | | 15.8 | 32.7 | 32.8 | | 18.7 | | |
| 60 | 17.5 | 11.2 | 61.3 | | | 10.0 | | 18.0 | 36.8 | 37.1 | | | 8.1 | |
| 61 | 5.0 | 23.4 | 61.6 | | | 10.0 | | 4.0 | 60.4 | 29.3 | | | 6.3 | |
| 62 | 20.0 | 20.0 | 40.0 | | | 20.0 | | 16.2 | 51.9 | 19.2 | | | 12.7 | |
| 63 | 14.4 | 28.6 | 37.0 | | | 20.0 | | 10.1 | 63.8 | 15.2 | | | 10.9 | |
| 64 | 25.1 | | 56.4 | | | | 18.5 | 30.1 | | 39.8 | | | | 30.1 |
| 65 | 37.0 | | 45.0 | | | | 18.0 | 42.5 | | 30.4 | | | | 27.1 |
| 66 | 18.5 | | 54.0 | | | | 27.5 | 21.1 | | 36.3 | | | | 42.6 |

By means of the above-mentioned sealing materials joints were made between tungsten and densely sintered aluminium oxide, molybdenum and densely sintered aluminium oxide, tantalum and densely sintered aluminium oxide, niobium and densely sintered aluminium oxide and two components of densely sintered aluminium together. For the assemblies 1 to 8 inclusive, 15, 17 to 24 inclusive, 27 to 35 inclusive, 36, 38, 40, 42 and 43 to 66 inclusive the temperature to which the weld must be heated must be between 1500° and 1600° C, for the assemblies 9 to 14 inclusive, 16, 25, 26 and 37, 39 and 41 between 1600° and 1700° C.

Some compositions crystallize rather quickly and spontaneous. Most compositions crystallize after a thermal treatment for some hours at a temperature which is 300° to 400° C below the temperature of application.

In the composite bodies obtained the following compositions were determined, for example with energy dispersive technics such as "Microprobe" and "EDAX". The average composition in the joint was determined herewith.

Table 1a

| | Composition in mole % | | | | Composition in mole % | | |
|---|---|---|---|---|---|---|---|
| No. | $Al_2O_3$ | $La_2O_3$ | $SiO_2$ | No. | $Al_2O_3$ | $La_2O_3$ | $SiO_2$ |
| 1 | 30.0 | 18.3 | 51.7 | 9 | 36.6 | 31.7 | 31.7 |
| 2 | 33.8 | 18.7 | 47.5 | 10 | 17.4 | 22.4 | 60.2 |
| 3 | 29.2 | 20.5 | 50.3 | 11 | 45.6 | 9.3 | 45.1 |
| 4 | 37.4 | 19.1 | 43.5 | 12 | 48.4 | 7.1 | 44.5 |
| 5 | 21.8 | 24.0 | 54.2 | 13 | 46.8 | 7.0 | 46.2 |
| 6 | 25.2 | 19.3 | 55.5 | 14 | 44.3 | 7.5 | 48.2 |
| 7 | 50.6 | 13.4 | 36.0 | 15 | 32.7 | 24.0 | 43.3 |
| 8 | 52.7 | 18.9 | 28.4 | 16 | 22.3 | 43.7 | 34.0 |

Table 2a

| | Composition in mole % | | | | Composition in mole % | | |
|---|---|---|---|---|---|---|---|
| No. | $Al_2O_3$ | $Y_2O_3$ | $SiO_2$ | No. | $Al_2O_3$ | $Y_2O_3$ | $SiO_2$ |
| 17 | 27.6 | 12.1 | 60.3 | 22 | 17.9 | 20.3 | 61.8 |
| 18 | 24.2 | 12.1 | 63.7 | 23 | 25.3 | 21.3 | 53.4 |
| 19 | 33.1 | 17.7 | 49.2 | 24 | 23.2 | 25.8 | 51.0 |
| 20 | 38.2 | 17.6 | 44.2 | 25 | 24.3 | 37.8 | 37.9 |
| 21 | 26.8 | 18.1 | 55.1 | 26 | 27.1 | 8.3 | 64.6 |

Table 3a

| | Composition in mole % | | | | |
|---|---|---|---|---|---|
| No. | $Al_2O_3$ | $La_2O_3$ | $B_2O_3$ | $SiO_2$ | $HfO_2$ |
| 27 | 36 | 33 | 31 | | |
| 28 | 19 | 47 | 34 | | |
| 29 | 22 | 43 | 35 | | |
| 30 | 33 | 26.6 | 27.7 | 12.7 | |
| 31 | 39 | 23 | 23.4 | 14.6 | |
| 32 | 50 | 16 | 20 | 14 | |
| 33 | 45 | 21.5 | 21.5 | — | 12 |
| 34 | 49 | 18.5 | 18.5 | — | 14 |
| 35 | 25 | 36.5 | 24.5 | — | 14 |

Table 4a

| | Composition in mole % | | | |
|---|---|---|---|---|
| No. | $Al_2O_3$ | $La_2O_3$ | $Y_2O_3$ | $SiO_2$ |
| 36 | 34.8 | 13.9 | 4.7 | 46.6 |
| 37 | 20.2 | 36.2 | 12.0 | 31.6 |
| 38 | 34.9 | 9.3 | 9.3 | 46.5 |
| 39 | 20.4 | 24.0 | 24.0 | 31.6 |
| 40 | 36.2 | 4.6 | 13.7 | 45.5 |
| 41 | 24.8 | 11.3 | 34.0 | 29.9 |
| 42 | 25.2 | 20.9 | 2.7 | 51.2 |

Table 5a

| | Composition in mole % | | | | | Composition in mole % | | | |
|---|---|---|---|---|---|---|---|---|---|
| No. | $Al_2O_3$ | $La_2O_3$ | $SiO_2$ | $B_2O_3$ | No. | $Al_2O_3$ | $La_2O_3$ | $SiO_2$ | $B_2O_3$ |
| 43 | 24.6 | 18.8 | 47.1 | 9.5 | 48 | 9.9 | 21.3 | 49.6 | 19.2 |
| 44 | 53.1 | 21.8 | 15.4 | 9.7 | 49 | 20.7 | 13.9 | 34.5 | 30.9 |
| 45 | 16.2 | 20.6 | 54.3 | 8.9 | 50 | 31.1 | 23.1 | 14.0 | 31.8 |
| 46 | 21.5 | 17.0 | 42.4 | 19.1 | 51 | 12.6 | 24.2 | 31.5 | 31.7 |
| 47 | 35.1 | 28.4 | 17.1 | 19.4 | | | | | |

Table 6a

| | Composition in mole % | | | | | | |
|---|---|---|---|---|---|---|---|
| No. | $Al_2O_3$ | $LaO_3$ | $SiO_2$ | $ZrO_2$ | $HfO_2$ | $TiO_2$ | $Sc_2O_3$ |
| 52 | 21.6 | 11.2 | 62.5 | 4.7 | | | |
| 53 | 28.1 | 17.5 | 49.6 | 4.8 | | | |
| 54 | 19.7 | 10.8 | 60.0 | 9.5 | | | |
| 55 | 32.4 | 17.6 | 40.3 | 9.7 | | | |
| 56 | 21.6 | 11.2 | 62.5 | | 4.7 | | |
| 57 | 31.0 | 19.4 | 44.9 | | 4.7 | | |
| 58 | 29.6 | 10.4 | 50.5 | | 9.5 | | |
| 59 | 21.1 | 10.8 | 58.6 | | 9.5 | | |
| 60 | 21.3 | 10.7 | 58.5 | | | 9.5 | |
| 61 | 17.3 | 20.3 | 53.6 | | | 8.8 | |
| 62 | 28.2 | 17.9 | 35.9 | | | 18.0 | |
| 63 | 21.6 | 26.2 | 33.9 | | | 18.3 | |
| 64 | 29.5 | | 53.2 | | | | 17.3 |
| 65 | 40.3 | | 42.6 | | | | 17.1 |
| 66 | 21.2 | | 52.2 | | | | 26.6 |

By way of example, the compositions 1 and 4 soften as glass at 850°–900° C, the glass crystallizes between 1050° and 1150° C and the crystallized material in the joint softens between 1500° and 1600° C and becomes liquid (viscosity < 100 poises).

EXAMPLE 2

Figure 11:
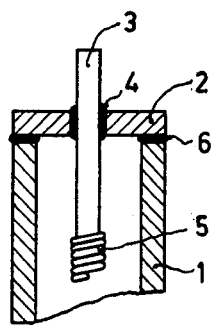
Figure 12:
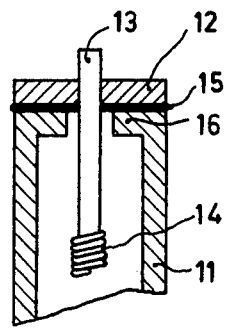

A discharge vessel for a high pressure mercury vapour discharge lamp with halide addition has on both sides a construction as shown in FIG. 11 or in FIG. 12. The lamp which is known in itself inter alia from U.K. patent specification No. 1,374,063 will not be further described here.

In FIG. 11 the discharge vessel consists of a tube 1 of densely sintered aluminium oxide and a disc 2 also of densely sintered aluminium oxide. In the disc 2 a molybdenum pin 3 is sealed vacuum-tight by means of sealing material 4 which has one of the compositions 1 or 4 of the Table of example 1. Within the discharge vessel a tungsten spiral 5 which serves as electrode is spot welded to the pin 3. Disc 2 is connected vacuum-tight to the tube 1 by means of sealing material 6 of the composition 1, 12 or 24 of the Table. FIG. 12 shows another construction of a discharge vessel consisting of densely sintered aluminium oxide 11. The electrode assembly here consists of an aluminium oxide-molybdenum cermet 12 in which a molybdenum can 13 is sintered vacuum-tight. Inside the discharge space the can 13 supports a tunsten electrode 14. The cermet disc 12 is joined vacuum-tight by means of the sealing material 15 of the composition 5 of Table 1 to the end portion 16 of the discharge vessel 11.

The joints 4 and 6 of FIG. 11 were made by means of rings of sintered glass. The joint was made by heating the assembly to 1600° C in argon and by cooling it slowly thereafter in which the glass crystallized.

The joint 15 was made by first covering the part 16 with an enamel coat of the composition 1, 12 or 24 of Table 1 and 2 respectively and by pressing the assembly 12-13-14 on it at a temperature between 940° and 1000° C under a pressure of 8 atm. Thereafter the assembly was heated for 15 minutes at 1100° C which caused the sealing material to devitrify. In the different joints thus obtained approximately the compositions 1, 4, 5, 12 and 24 of Table 1a and 2a respectively were determined.

In accordance with one form of the invention a composite body is manufactured by coating at least one of the parts to be joined with a layer of sealing glass at the surface at which the joint is to be made. The parts at the locations where they are to be joined are heated in contact with one another to a temperature up to approximately 100° C above the softening temperature of the sealing glass and then a pressure is applied to the joint while parts in the sealing glass and the joint is heated at a temperature of 150° C to 250° C above the sealing glass softening temperature until the sealing glass crystalizes.

Figure 9:
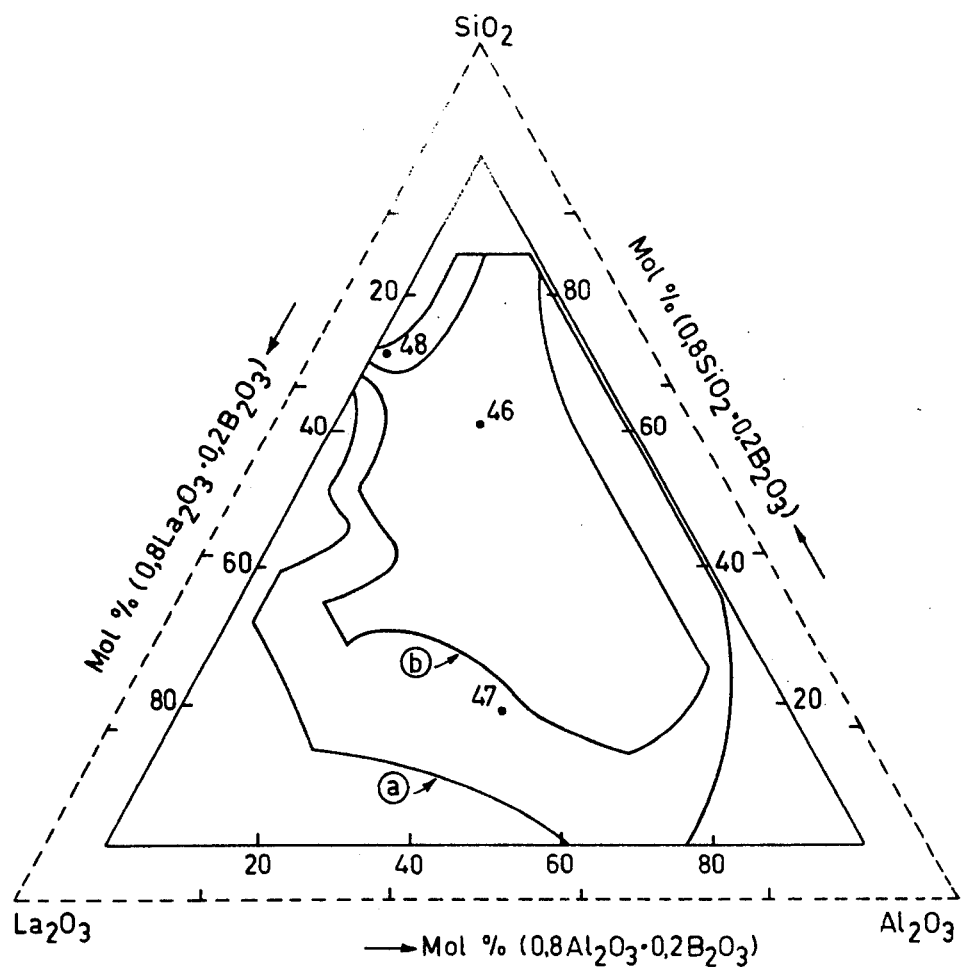
Figure 10:
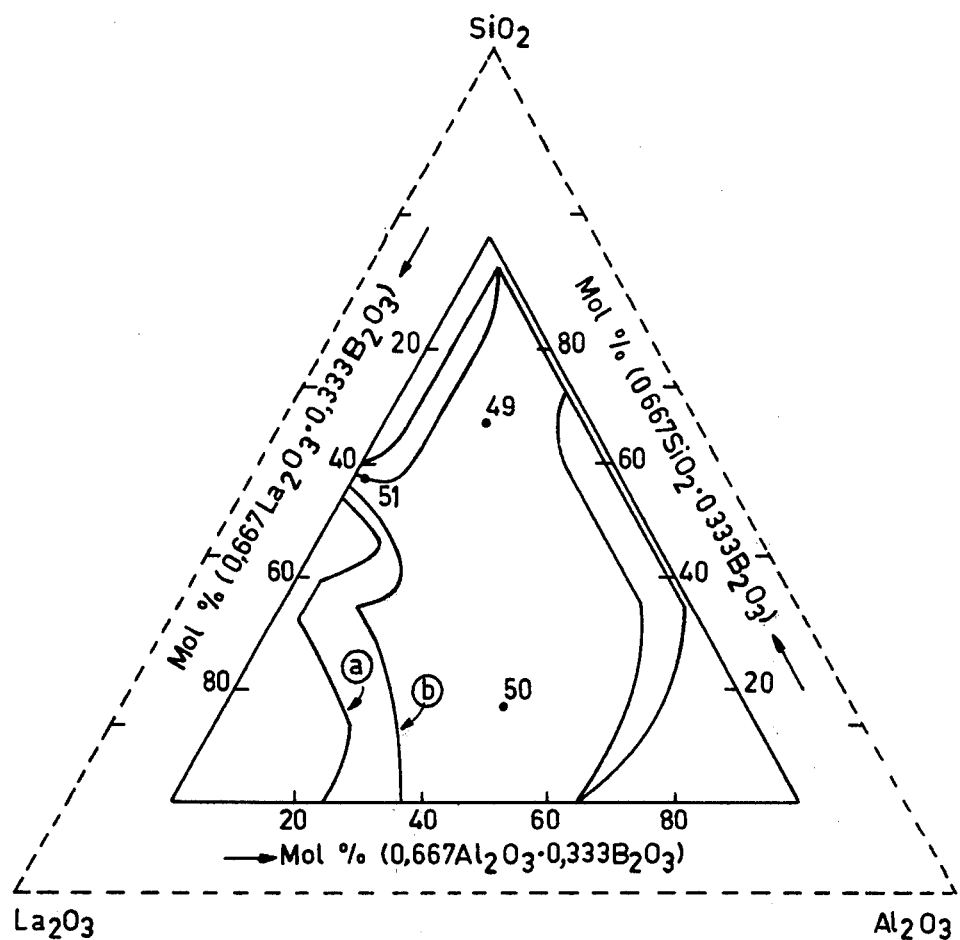

What is claimed is:

1. A composite body comprising two parts formed of a material selected from the group consisting of (1) densely sintered aluminum oxide, (2) sapphire, (3) one of the metals tantalum, niobium, tungsten, molybdenum, (4) an alloy having as the main component a metal selected from the group consisting of tantalum, niobium, tungsten, iron, nickel and cobalt and (5) a material consisting of a mixture of a metal oxide and a metal, said parts being joined together in gas and vacuum-tight relationship by means of sealing material which results in a joint which is resistant to the action of iodide, bromide and chloride vapours and liquid at temperatures up to approximately 1350° C, said sealing material including aluminum oxide and an oxide of a rare earth metal, wherein said joint comprises at least two of the oxides $SiO_2$, $Al_2O_3$ and $B_2O_3$ and at least one of the trivalent oxides $La_2O_3$ and $Y_2O_3$ in quantities which in mole % have at the utmost the following value: $SiO_2$ 66.6, $La_2O_3$ 50, $B_2O_3$ 50, $Y_2O_3$ 50 and $Al_2O_3$ 70, the sealing material for obtaining the joint being applied at a temperature of not more than 1700° C and the material of the joint obtained therewith being located in a composition range within a tetrahedron formed by the components $Al_2O_3$-$La_2O_3$-$SiO_2$-$B_2O_3$, whose limits in the side planes of the tetrahedron are shown in the accompanying FIGS. 1, area ⓐ 2, area ⓐ and 3, area ⓐ and which are further defined by the cross-sections in FIG. 8, area ⓐ, FIGS. 9, area ⓐ and FIG. 10, area ⓐ, or in a composition range located within a tetrahedron formed by the components $Al_2O_3$-$La_2O_3$-$SiO_2$-$Y_2O_3$, whose limits in the side planes of the tetrahedron are shown in the FIGS. 1, area ⓐ and 4, area ⓐ, 6 area ⓐ and 7, area ⓐ.

2. A composite body as claimed in claim 1, wherein said sealing material is applied at a temperature of not more than 1600° C and the material of the joint obtained therewith is located in a composition range within a tetrahedron, formed by the components $Al_2O_3$-$La_2O_3$-$SiO_2$-$B_2O_3$, whose limits in the side planes of the tetrahedron are shown in the accompanying FIGS. 1, area ⓑ, 2, area ⓑ and 3, area ⓐ and which are further defined by the cross-sections in FIGS. 8, area ⓑ, 9, area ⓑ and 10, area ⓑ, or in a composition range located within a tetrahyedron formed by the components $Al_2O_3$-$La_2O_3$-$SiO_2$-$Y_2O_3$ whose limits in the side planes of the tetrahedron are shown in the accompanying FIGS. 5, area ⓑ, 6, area ⓑ and 7, area ⓑ.

3. A composite body as claimed in claim 1, wherein said sealing material having $La_2O_3$, $Y_2O_3$, or mixtures thereof is wholly or partly replaced by one or more oxides of the lanthanides and of scandium.

4. A composite body as claimed in claim 1 wherein a total of not more than 20 mole % of one or more of the oxides $TiO_2$, $ZrO_2$ and $HfO_2$ is present in the material of the joint.

5. A method of producing a composite body of the type claimed in claim 1, which comprises: coating at least one of said parts with a layer of sealing glass at the surface at which the joint is to be made, heating said parts in contact with one another to a temperature to approximately 100° C above the softening temperature of the sealing glass, applying a pressure to the joint thereafter while said parts and said sealing glass and said joint is heated at a temperature of 150° to 250° C above the sealing glass softening point until said sealing glass crystallizes.

6. Apparatus as described in claim 1 wherein said two parts are made of densely sintered aluminum oxide and are a discharge tube and a closure member for said discharge tube, said apparatus further including an electrode feedthrough of molybdenum, a gas filling consisting of mercury vapour doped with a metal chloride, -bromide or -iodide, said aluminum oxide parts being joined together and to said molybdenum by means of said sealing material.

* * * * *